K. G. MOLTZNER.
FRUIT CUTTING AND PITTING MACHINE.
APPLICATION FILED MAR. 23, 1918.

1,334,162.

Patented Mar. 16, 1920.
2 SHEETS—SHEET 1.

Inventor:
Karl G. Moltzner
by
Atty.

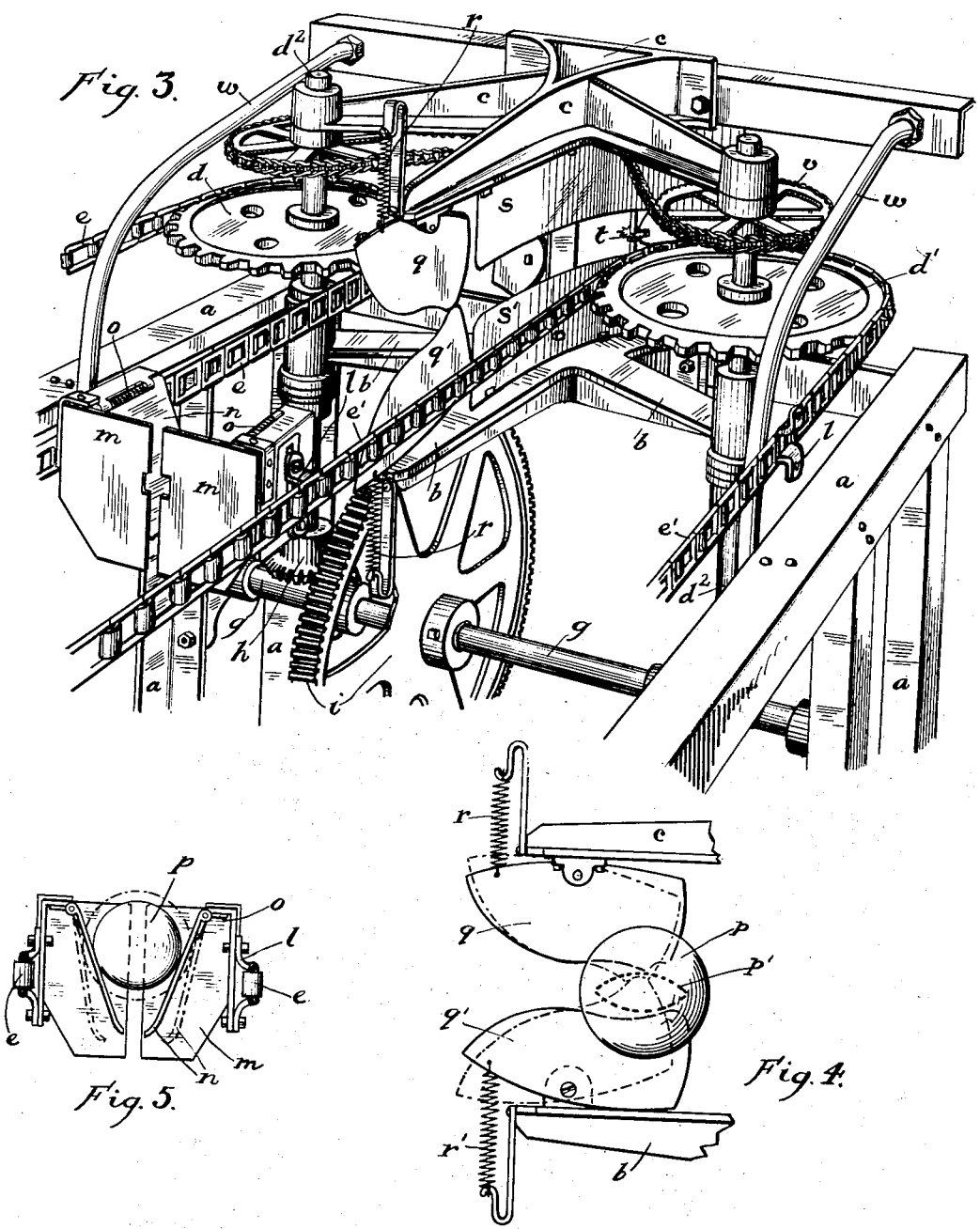

UNITED STATES PATENT OFFICE.

KARL G. MOLTZNER, OF ANDERSON, CALIFORNIA, ASSIGNOR OF ONE-FOURTH TO THOMAS A. MARLOWE, OF PORTLAND, OREGON.

FRUIT CUTTING AND PITTING MACHINE.

1,334,162.  Specification of Letters Patent. Patented Mar. 16, 1920.

Application filed March 23, 1918. Serial No. 224,279.

*To all whom it may concern:*

Be it known that I, KARL G. MOLTZNER, a citizen of the United States, and a resident of Anderson, county of Shasta, State of California, have invented a certain new and useful Improvement in Fruit Cutting and Pitting Machines, of which the following is a specification.

The object of my invention is to provide a simple and efficient machine for halving such fruit as peaches and apricots, and removing the pit from the half to which it may adhere.

A further object of my machine is to insure that the fruit will be cut right down to the pit so as to facilitate the removal of the latter, and in this way keep the two halves in good condition; in other words, preventing the tearing of the parts of the fruit away from either half in removing the pit.

Furthermore, my invention includes novel and efficient means for removing the pit from that half of the fruit to which it may adhere.

In the accompanying drawings of my invention:

Figure 1:
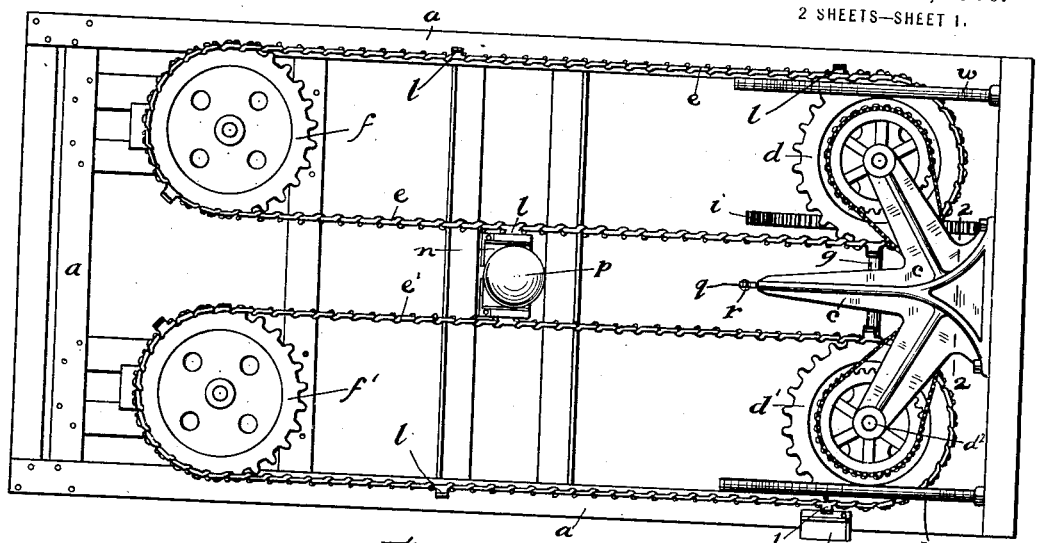
Figure 1 is a plan or top view of my machine.
Figure 2:
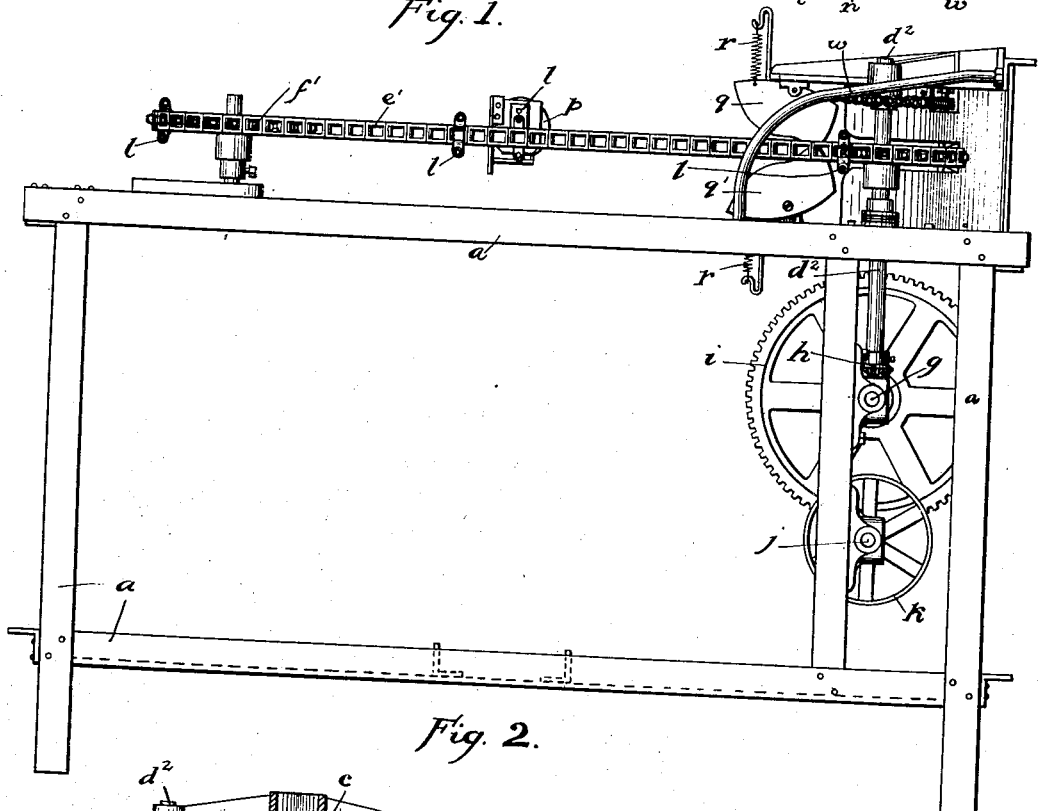
Fig. 2 is a front side elevation thereof.
Figure 2A:
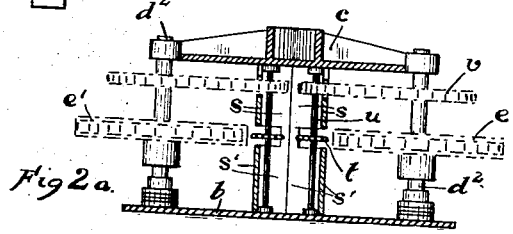

Fig. 2ª is a sectional detail on the line 2—2 of Fig. 1;

Fig. 3 is a perspective showing more particularly the device with which my invention is directly concerned;

Fig. 4 is a detail of the fruit cutting or halving element; and

Fig. 5 is a detail of the means provided for carrying the fruit to and past the fruit cutting element.

*a* represents the frame of my machine, including members *b*, *c* at one end, in which the sprocket gears *d*, *d'* are journaled. The latter gears are connected by sprocket chains *e*, *e'*, with the sprocket gears *f*, *f'* located in the opposite end of my machine. The sprocket gears *d*, *d'* are driven from a main shaft *g* by means of bevel gear element as *h*, only that related to the sprocket gear *d* being shown in Fig. 3, and the driving means being illustrated in a general way in Fig. 2; *i* being a gear meshing with a pinion, not shown, on the shaft *j*, on which is mounted the wheel *k*.

Each of the sprocket chains *e*, *e'* carries one half of the fruit carrier. The attachment is effected, as more clearly shown in Fig. 5, by brackets *l*. Each carrier part consists of a transverse plate *m*, and a hinged arm *n* controlled by a spring *o*, the springs *o* being adapted to hold the arms *n* toward each other, and in this way supporting the fruit represented by *p*. The fruit cutting element consists of two opposed knife members *q*, *q'*, pivoted in a vertical plane and curved so as recede at that end against which the fruit is first brought into contact, and their opposite ends being adapted to be in contact with each other, as illustrated in Fig. 4. The knife members *q*, *q'* are controlled by coil-springs *r*, *r'*, tending to hold the knife members in the position they are shown in dot-and-dash outline in Fig. 4. In the latter figure *p'* represents the stone or pit of the fruit.

As will be observed from Fig. 4, the construction of the knife members *q*, *q'*, and their control thereof by the springs *r*, *r'*, is such as to insure that the fruit will be cut clear through and all around and right down to the pit thereof; in this way insuring that the halves will be completely severed, and further insuring that the two halves of the fruit will be in good condition and not mutilated by parts thereof being torn away when the pit is removed.

After the fruit has been halved, it is advanced against the fruit separating element of my machine. This comprises diverging plates arranged in upper and lower sections, as *s*, *s'*, one above the other, with a sufficient space between them to pass the pit of the fruit; and in such space is located, on either side of said fruit dividing plates, spur wheels *t*, on shafts *u*, driven by means of sprocket chains *v*, connecting a sprocket pinion and the sprocket gear on the shafts *u* and *d²* respectively. This construction will be clear by comparing Figs. 2ª and 3.

Thus assuming the fruit to be a peach, after it has been halved, the pit will be carried by either half, and as the pit-carrying half passes the related spur-gear *t* the latter will operate to dislodge and remove it.

The arrangement of the brace members *w* of the frame, and the arrangement and construction of the other parts of my machine is not material to my invention, but may be made as deemed convenient.

I claim:

1. In a machine of the character described, the combination of a fruit-cutting element comprising two opposed knife-blades pivoted at points intermediate their ends, the knife-blades having diverging curves at their forward ends, against which the fruit is brought first, and converging from such forward ends to their rear ends, springs operating to hold the forward ends of the knife-blades spaced apart normally, and means for carrying the fruit past the cutting element.

2. In a machine of the character described, the combination of a fruit-cutting element comprising two opposed, pivoted knife-members receding at that end against which the fruit is brought first and coming together at the opposite end, springs attached at said receding ends of the knife-members and adapted normally to hold the same apart at said end, means for carrying the fruit to and past the cutting element, means located beyond the knife-element for separating the two halves of the fruit, such means comprising diverging portions arranged in two sections, spaced apart, to admit the pit of the fruit between them, and a pit remover comprising a driven spur wheel projecting in said space between said sections of the fruit separating element.

3. In a machine of the character described, a fruit-carrying element comprising driven parallel endless chains, each provided with one-half of a fruit-carrier, and each half carrier comprising a perpendicularly projecting plate and a spring controlled hinged arm, said plates and arms coöperating with each other.

4. In a machine of the character described, in combination with a fruit-carrying element comprising driven parallel endless chains, each provided with one-half of a fruit-carrier, a pair of spring-controlled knives adapted to cut the fruit circumferentially between said half carriers, means for separating and carrying the two halves of the fruit in diverging directions, and driven spur-gears located to dislodge the pit of the fruit carried by either separated half thereof.

5. In a machine of the character described, in combination with a fruit-carrying element comprising parallel members each provided with one-half of a fruit-carrier, a pair of spring-controlled knives adapted to cut the fruit circumferentially between said carriers, means for separating and carrying the two halves of the fruit in diverging directions, said separating means provided with a horizontal space, and a pit removing element located in such space for dislodging the pit of the fruit carried by either separated half thereof.

KARL G. MOLTZNER.